Nov. 24, 1936.  E. PICK  2,061,714
WATER TREATING APPARATUS
Filed Sept. 20, 1934  3 Sheets—Sheet 1
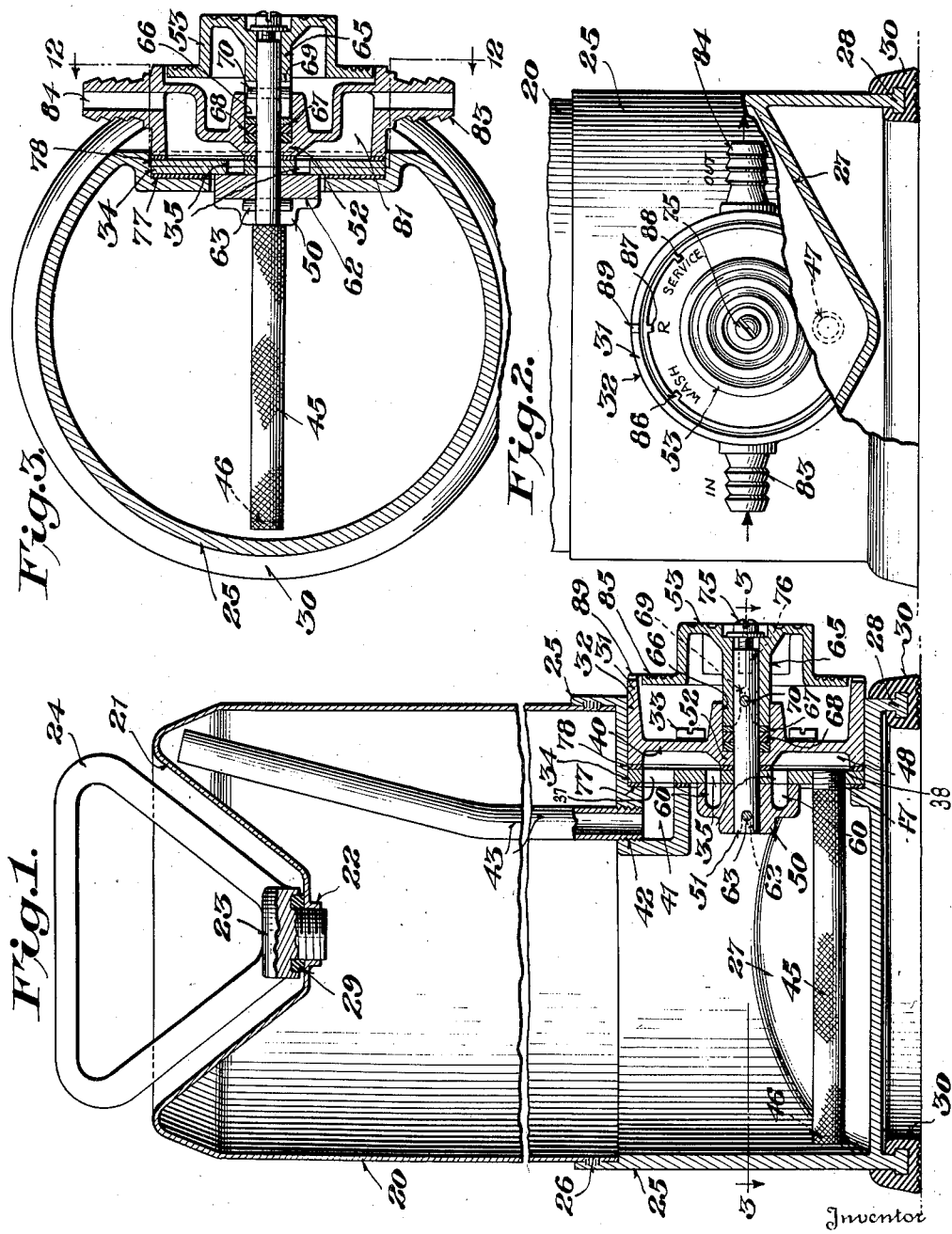
Inventor
*Eric Pick,*
By K. P. McElroy
Attorney Nov. 24, 1936. E. PICK 2,061,714
WATER TREATING APPARATUS
Filed Sept. 20, 1934 3 Sheets-Sheet 2
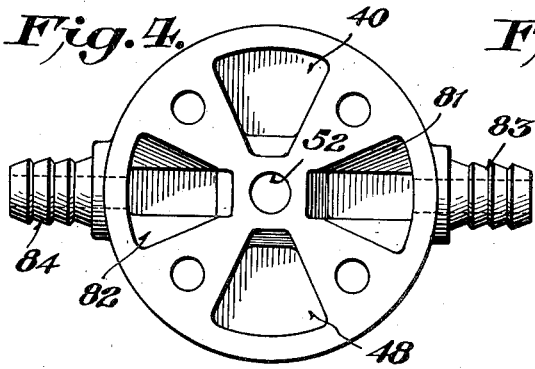
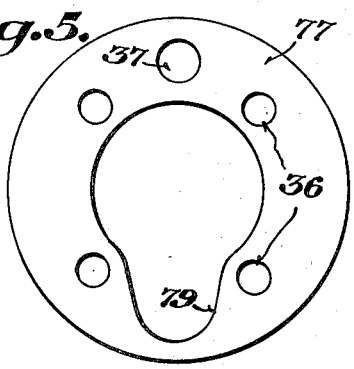
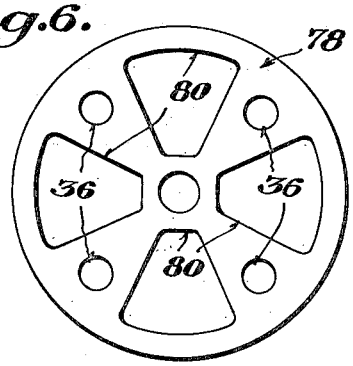
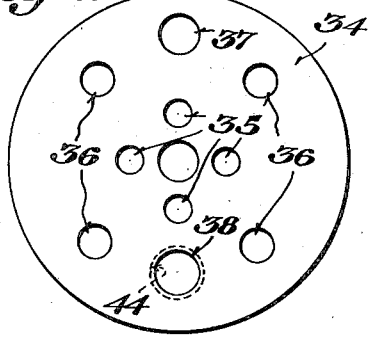
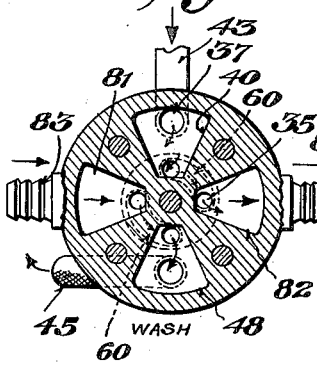
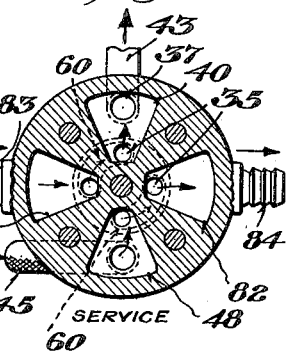
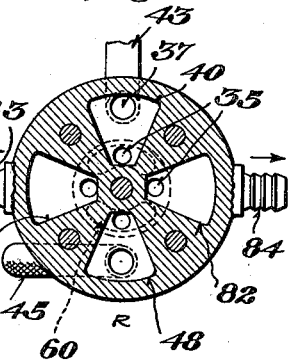
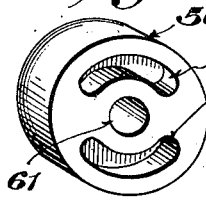
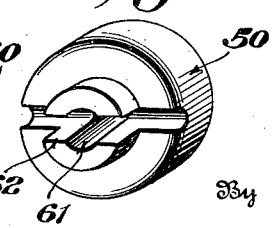
Inventor
Eric Pick,
K. P. McElroy
Attorney Nov. 24, 1936.  E. PICK  2,061,714
WATER TREATING APPARATUS
Filed Sept. 20, 1934  3 Sheets-Sheet 3

Inventor
Eric Pick,
By K.P. McElroy
Attorney

Patented Nov. 24, 1936

2,061,714

UNITED STATES PATENT OFFICE 2,061,714

WATER TREATING APPARATUS

Eric Pick, New York, N. Y., assignor to The Permutit Company (1934), Wilmington, Del., a corporation of Delaware Application September 20, 1934, Serial No. 744,835

7 Claims. (Cl. 210—24)

This invention relates to water treating apparatus; and it comprises improved portable water treating apparatus having a container for zeolites or filtering material, a distributor therein and a rotary multiway valve in the container controlling flows of water to and from the apparatus and comprising a stator and a rotor, the stator being attached in an opening in the base or side of the container and having ports and passages, the rotor extending into the casing and being exposed therein, the rotor having passages adapted to cooperate with the passages in the stator to establish connections for flows through the softener, including the distributor, in the operating positions of the valve, the valve having means for retaining detachable inlet and outlet connections for the apparatus, the valve further having packing means and adjustment means for tightening the rotor with respect to the stator and for simultaneously tightening the packing; all as more fully hereinafter set forth and as claimed.

In water softening apparatus for permanent installation, light weight, moderate size and compactness, while desirable qualities, are not essential. The valves, piping, salt storage means, etc., can be arranged primarily with a view to accessibility and convenience. Simplicity is not essential. Auxiliary apparatus, such as brine saving systems, flow controls, etc., can be incorporated. In portable softeners, on the other hand, compactness is essential. Portable softeners are designed for light or temporary service, such as for occasional laboratory or household use. They must be readily transportable to the point of use and readily attachable to the source of raw water and to service. Above all, such apparatus must be simple to work, since its control often depends on unskilled operators. The operations necessary for the regenerating operation must be as few and as uncomplicated as possible. The same considerations apply in the case of portable filtering apparatus such as small filtering units utilizing sand or activated carbon for example.

The present invention relates to an improved portable water treating apparatus which embodies these desirable features. The apparatus is designed with a view to maximum simplicity, compactness and lightness. Attachment and operation are readily performed even by untrained operators.

The invention will be described with particular reference to water softening. The apparatus of the invention comprises a container for holding a charge of base exchange material (zeolites) and a simplified multiway control valve for controlling flows to and from the softener during softening and washing. Softener connections to the raw water source and to service are made directly to the valve, by means of detachable flexible connections. The valve has a stator and a rotor, the stator being attached in an opening in the casing wall or base and the rotor being inside the zeolite container and exposed therein and a port plate interposed between rotor and stator. The rotor has channels, cooperating with the port plate in the operating positions of the valve to direct the flows. The rotor is turned by a valve stem extending out through the stator; packing being provided for the stem. Means are provided whereby the rotor may be adjusted with respect to the port plate and the packing may be simultaneously tightened, by a single adjustment from outside the container. A distributor is provided in the container, connected directly to the valve.

In the accompanying drawings are shown, more or less diagrammatically, two specific embodiments of apparatus within the invention.

In the drawings—

Fig. 1 is a view in vertical section of one embodiment of apparatus, having the valve in the base;

Fig. 2 is a view partly in elevation, partly in vertical section, of the bottom portion of Fig. 1;

Fig. 3 is a horizontal sectional view taken along line 3—3 of Fig. 1;

Fig. 4 is a view in elevation of the rear of the stator;

Fig. 5 is a view of the inner valve gasket;

Fig. 6 is a view of the outer valve gasket;

Fig. 7 is a view of the port plate;

Figs. 8 and 9 are perspective views of the valve rotor;

Figs. 10, 11 and 12 are sections of the valve along line 12—12 of Fig. 3, showing the operating positions;

Figure 14:
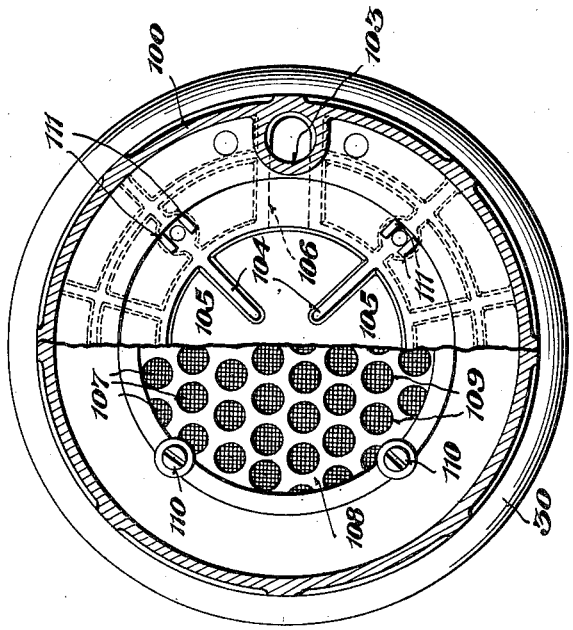
Fig. 14 is a sectional view taken along line 14—14 of Fig. 13 and showing the distributor arrangement.

In the drawings, in which like reference characters indicate like parts throughout, Fig. 1 shows a modification having the valve and distributor in the base. As shown, the softener comprises an outer container or shell 20, of suitable height and advantageously of thin deep drawn metal or other suitable material and having a funnel-like depression 21 formed in the top with a threaded orificed inlet member 22. A removable plug 23 having a gasket 29 and provided with a handle 24 closes this inlet. The funnel-like top of the apparatus is useful for introducing brine or salt into the container. In filter embodiments it serves for the introduction of the filtering material. A base member 25, ordinarily of somewhat heavier construction than the shell, as shown, is attached to the container as at 26 by solder or the like. The base is shown as having a V-shaped trough-like bottom portion 27 and an annular rim portion 28 having a guard ring 30 of soft rubber attached thereto. The base carries a valve, shown as comprising a stator member 31 inset into the base in a bore 32 and fastened to the base by screws 33, as shown. Between the stator and the base and forming in effect an integral part of the stator is positioned a port plate 34, advantageously of formica or hard rubber. The port plate has four inner ports 35, four outer holes 36 to receive screws 33, and two peripheral fluid ports 37 and 38 (Fig. 7). Upper port 37 is in communication with a channel 40 in the stator (Figs. 1 and 4) and with a passage or duct 41 in the base member. Passage 41 is threaded as at 42 and a vertical pipe 43 is attached to the base at this point. Pipe 43 extends to the top of the softener, delivering into the distributing groove left between the upper part of the funnel and the casing walls as shown. The pipe serves as the inlet duct for the softener during softening. The lower port 38 in the port plate is threaded as at 44 and a distributor tube 45, advantageously of fine woven wire cloth and plugged at the outer end as at 46, is attached to the port plate at 44 by a cylindrical bored, threaded nipple 47 as shown. Channel 40 in the stator delivers to topmost bore 35 in the port plate; the lowermost bore 35 in the port plate delivers to the distributor through a stator channel 48 (Fig. 4).

The rotary part of the valve comprises a rotor disk 50 operatively connected with a valve shaft 51 extending outwardly through the stator through a bore 52 and operatively connected outside with a knob 53 as shown. The rotor disk, shown in detail in Figs. 8 and 9, has two arcuate channels 60 opposing the port plate, a bore 61 closely fitting the valve shaft and a lateral slot 62. The end of the valve shaft carries a crosswise pin 63 engaging slot 62. The knob 53 has an inwardly extending hollow shank 65 snugly fitting the valve shaft and fitting in the bore 66 in the stator. Between the shank and the stator is interposed a metal washer 67 and packing rings 68. The shank is slotted as at 69, the slot engaging a second pin 70 extending through the valve shaft. The knob is held to the shaft by means of an adjusting screw 75 threaded into the shaft as at 76. Upon tightening the screw, the rotor disk is tightened against the port plate, while at the same time, the shank of the knob is pressed against the packing. This simple means serves for simultaneous adjustment of the rotor and of the packing.

Gaskets are advantageously used on each side of the port plate. Fig. 5 shows the inner gasket 77 and Fig. 6 the outer gasket 78. The inner gasket has holes 36 for passing screws 33 corresponding to holes 36 in the port plate, port 37 corresponding to upper port 37 in the port plate and an orifice 79 leaving open the port plate ports 35 and the end of the distributor. The outer gasket has holes 36 and sector openings 80 corresponding to channels in the stator, described post.

Channels 40 and 48 lead to pipe 43 and distributor 45 respectively, as described. Two lateral channels 81 and 82 (see Fig. 4) lead to a pair of nipples 83 and 84 on the stator. These nipples are for connection, through flexible hose means, not shown, to the raw water supply and to discharge respectively.

The operation of the valve can best be understood by considering the operation of the softener. The valve knob is shown as having a dial portion 85 with indicators 86, 87 and 88 marked "Wash", "R" and "Service", respectively, and adapted to be moved in registry with an index 89 on the stator (Fig. 2).

In operation, assuming the softener is connected to a source of raw water and to a point of use and that the zeolite is in regenerated condition, when the valve is turned to service position (Fig. 11) raw water enters through nipple 83 communicating with chamber 81 in the stator and thence into one of the channels 60 in the rotor disk and into sector-like channel 40 in the stator, whence the water passes through port 37 and passage 41 into pipe 43. Water flows from the upper end of pipe 43 downwardly through a bed of zeolites (not shown) in the casing and becomes softened. Softened water passes from the bottom of the container through distributor 45 and nipple 47, thence through lower port 38 to chamber 48 in the stator, through the other arcuate channel 60 in the rotor disk to stator channel 82, and to service through nipple 84. The flows through the valve in this stage are diagrammed in Fig. 11, which, together with Figs. 10 and 12, are simplified diagrammatic representations of the stator channels, port plate and rotor, for the purpose of clearly showing the course of liquids through the valve.

When it becomes necessary to regenerate the zeolites after exhaustion thereof the valve knob is turned to "wash" position for backwashing the zeolites. Water flows in through nipple 83, chamber 81 in the stator, through one channel 60 in the rotor disk, channel 48, nipple 47 and distributor 45 to the bottom of the container. Wash water leaves the top of the container through pipe 43, passage 41, port 37, stator channel 40, the other arcuate channel 60 in the rotor disk, stator channel 82 and nipple 84. Fig. 10 shows the course of the water. The course of the water through the softener in the washing step is just opposite from that in the softening step.

In regenerating the zeolites the valve is turned back to service position, the raw water supply being shut off independently, and, in one advantageous mode of operation, plug 23 is unscrewed and water is drawn off from the softener until the water level is a few inches below the top opening. Then a quantity of salt is poured into the container, the funnel-like top portion assisting in this operation, and the plug is replaced. A small volume of water is next displaced from the container by turning on the raw water supply; thereby insuring that the interstices between the zeolite granules in the container are completely filled with brine.

The valve is then turned to "R" position, and the softener left to stand for a while. In this position the valve shuts off the softener inlet and outlet. Arcuate channels 60 in the rotor disk are clear of lateral ports 35 in the port plate, hence closing off flow to and from nipples 83 and 84. The "R" position is also used when the softener is carried about, to prevent spilling of liquid from the softener. The softener is shown in "R" position in Figs. 1 to 3 and 12.

After a suitable length of time to allow regeneration of the zeolites to take place, the valve is turned to "service" position and the waste liquid in the container flushed out, whereupon the apparatus is ready for a new softening operation.

Figure 13:
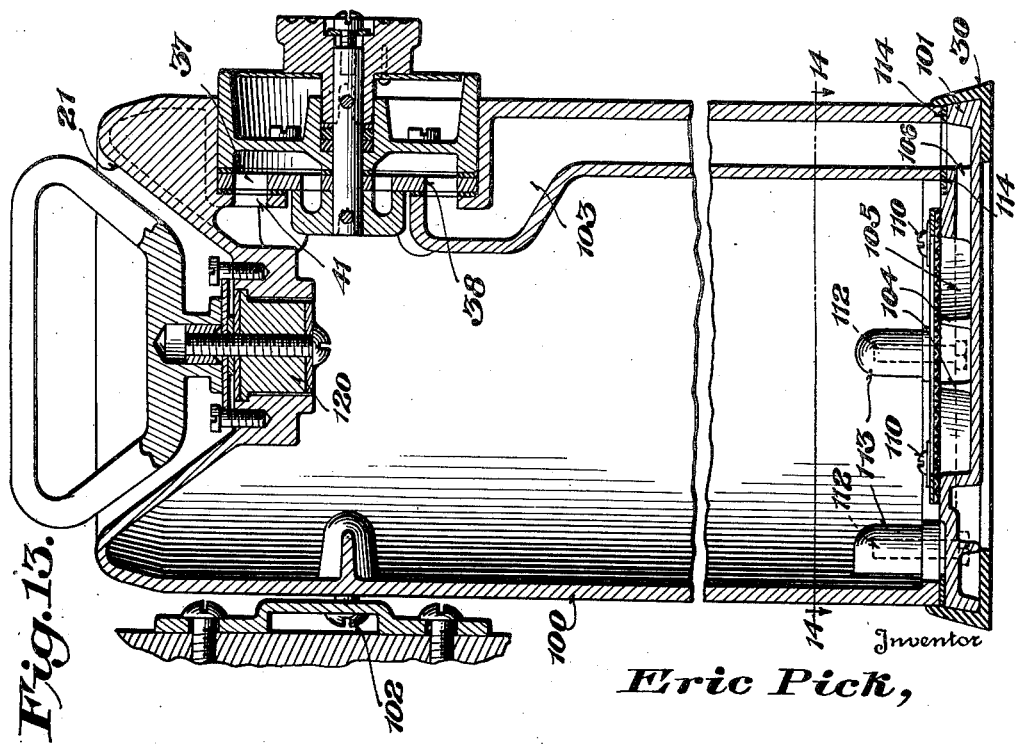
Fig. 13 is a view of another specific embodiment of the apparatus having the valve at the top of the casing wall.

Figs. 13 and 14 show a modification of the apparatus just described, having the valve at the top and adapted to be embodied in a container of somewhat thicker or more rigid material. As shown, the apparatus comprises a unitary container 100, of aluminum or other light, water-resistant material, of suitable height and having a distributor base 101, a detachable closure of bayonet-thread type 120, detachable means, indicated at 102, for hanging up the softener, and a valve in the upper container wall.

The valve proper is generally similar to that in Figs. 1 to 9, and the description thereof given applies. Lower port 38 in the port plate communicates with the distributor base 101 through a conduit 103 integral with the container and extending to the bottom thereof. Upper port plate port 37 communicates directly with the top of the container, as shown.

The distributor base 101, shown in detail in Fig. 14, comprises radial grids 104, the space 105 between the grids being in communication with the lower end of conduit 103 through a passage 106. Over the grids is placed a disk of fine woven metal cloth 107 held in place by a disk 108 perforated as at 109 and retained to the base by screws and washers 110. Projections 111 on base 101 prevent tilting of the washers. The base is retained to the container by a plurality of screws 112 seated in lugs 113 in the bottom portion of the container. The metal cloth prevents zeolite grains from getting into the grid system. During backwashing water enters the bottom of a bed of zeolites (not shown) in the container through the distributor and is uniformly diffused. A suitable gasket 114 is interposed between the distributor base and the container, and a rubber guard 30 is fitted around the base, as shown.

The operation of this softener is similar to that of the first described modification, and needs no further description. In this design, it is usually more convenient to add the salt in the form of brine rather than in solid form.

The softeners present many advantages in construction and in operation. The simplified valve construction makes for cheapness and ease in manufacture and assemblage. For example, in assembling the valve it is merely necessary to insert pin 70 in the valve shaft, insert the shaft with packing rings 68 and washer 67, through the stator bore 52 and the central hole in port plate 34, slip the rotor disk 50 on the shaft, insert pin 63 to retain the disk, attach the assembly to the container by means of screws 33, place knob 53 on the shaft and screw it in place with screw 75. The entire valve may be readily removed for inspection by removing the knob and screws 33 and pulling the valve assembly out.

While the invention has been described as embodied in a water softener, it can be embodied in other forms of water treating apparatus, such as filters, with equally advantageous results. In filtering apparatus within the invention, the filter bed can be reconditioned by backwashing in the manner described and then rinsing by passing a small amount of water downwardly through the apparatus in the service position of the valve.

What I claim is:—

1. Portable water treating apparatus comprising a container for water treating material, the container having an opening therein, a distributor in the container and a rotary multiway valve for controlling flows of water to and from the apparatus, said valve comprising a stator covering said opening, an inlet connection and an outlet connection for the stator, four channels in the stator, two of said channels communicating respectively with the inlet and outlet connections and the other two communicating respectively with the distributor and with the interior of the container, the stator having a face exposed through the opening to the interior of the container and covering said channels, four ports in said face communicating respectively with said four stator channels, and a rotor inside the container and exposed therein and having a channeled face opposed to the stator face and in different positions of the rotor making connections between the stator face ports for establishing different flows through the apparatus.

2. Portable water treating apparatus comprising a container for water treating material, a distributor therein and a rotary multiway valve in the container for controlling flows of water to and from the apparatus and comprising a stator attached to the container and having an inlet connection and an outlet connection and ports and passages in communication with the interior of the softener and with the inlet and outlet connections, a channeled rotor cooperating with the stator, the channels being opposed to the stator and in different rotor positions making connections between stator ports for establishing different flows through the apparatus, a shaft operatively connected to the rotor and extending outward through the stator, packing means between the shaft and the stator, means for turning the shaft, said means being in contact with the packing means, and adjustable, threaded means cooperating with the shaft for drawing the rotor and the turning means towards each other so as simultaneously to tighten the rotor against the stator and to tighten the packing means.

3. In water treating apparatus a valve comprising a stator having ports and passages for fluid flows, a channeled rotor cooperating with the stator, the channels in different rotor positions making connections between stator ports for establishing different flows, a valve shaft connected to the rotor and extending through the stator, packing between the shaft and the stator, means for turning the shaft, said means contacting the packing and adjustable, threaded means cooperating with the shaft for drawing the rotor against the stator and for simultaneously drawing the turning means against the packing.

4. Portable water treating apparatus comprising a container shell and a separate base for the container, the container shell and base cooperating to form a casing to hold a charge of water treating material, the base having inset therein a detachable rotary multiway valve having a channeled rotor extending into the container and means for detachably retaining the valve means in the base, the valve means having inlet and outlet connections and ports and passages in communication with the interior of the softener, a distributor attached to and in direct communication with the valve means and a conduit in direct communication with the valve means and extending upward towards the top of the container, the valve means and attached distributor being readily removable from the base as a unit.

5. Improved and simplified portable water treating apparatus comprising a container for water treating material having an opening therein, a distributor in the container and a rotary multiway valve in the container for controlling flows of water to and from the apparatus and comprising a stator and a rotor, the stator being inset in the opening and attached to the container and having four inner chambers in communication respectively with the distributor, with a channel in communication with an end of the container, with a source of raw water and an outlet, the stator further being provided with a port plate having four ports communicating with the four inner chambers described and two bores communicating respectively with the channel and with the distributor, the stator further having a centrally located circular bore, the rotor having a flat face opposed to the port plate and an impervious back extending exposed into the container and having arcuate channels in the flat face opposed to the ports in the port plate and registering therewith and a shaft extending from the rotor out through the central stator bore for turning the rotor, the rotor in different angular positions making connections between the various port plate ports for establishing different flows through the apparatus, packing means between the valve shaft and the stator and adjusting means for simultaneously tightening the rotor against the port plate and for tightening the packing.

6. Portable water treating apparatus comprising a container for water treating material, the container having an opening therein, a distributor in the container located near one end thereof, a duct in the container terminating on the inside of the container near the end thereof opposite to the end near which the distributor is located and a rotary multiway valve in the container for controlling flows of water to and from the apparatus and comprising a stator inset in the opening, means for detachably attaching the stator to the container, the stator having an inwardly presented face with ports therein, the stator being exposed through the opening to the interior of the container and having an inlet connection and an outlet connection and passages connecting said stator face ports with the duct, with the distributor, with the inlet connection and with the outlet connection, a two-faced rotor inside the container and having one impervious face exposed therein, the rotor having the face opposite thereto contacting said face of the stator in the container, and channels in said face of the rotor opposed to and cooperating with the ports in the stator and in different positions of the rotor making connections between stator ports for establishing different flows through the apparatus; the stator and rotor being removable from the opening as a unit.

7. Portable water treating apparatus comprising a container for water treating material, the container having a flat face with ports leading to the interior of the container, a distributor in the container located near one end thereof, a duct in the container terminating on the inside of the container near the end thereof opposite to the end near which the distributor is located, and a rotary multiway valve for controlling flow to and from the apparatus and comprising a port plate in contact with said flat face, the port plate having four ports located on a circle and two bores, one of said bores communicating with the distributor, and the other of said bores communicating with the duct, a stator attached to the container in contact with the port plate and having an inlet connection, an outlet connection and four inner chambers, one of said chambers connecting one port plate port with the inlet connection, the second of said chambers connecting the second port plate port with one of said port plate bores, the third chamber connecting the third port plate port with the outlet connection, the fourth of said chambers connecting the fourth port plate port with the other port plate bore, a rotor in contact with the port plate and having one face with channels therein cooperating with the port plate ports and interconnecting different pairs of port plate ports in different angular positions of the rotor, the opposite face of the rotor being impervious and being exposed to the interior of the container, and turning means connected with the rotor and extending to the outside.

ERIC PICK.